United States Patent Office 2,893,978
Patented July 7, 1959

2,893,978

EPOXIDE RESINS, ETC.

Harold G. Cooke, Jr., Louisville, Ky., assignor to Devoe & Raynolds Company, Inc., Louisville, Ky., a corporation of New York No Drawing. Application May 2, 1957
Serial No. 656,516

15 Claims. (Cl. 260—47)

This invention relates to epoxy resins and other products resulting from the reaction of triglycidyl cyanurate with dihydric phenols, and includes the new products and the method of producing them.

The process of the invention is one in which triglycidyl cyanurate is reacted with dihydric phenols in proportions varying from about 1 mol of dihydric phenol to 2 mols of triglycidyl cyanurate, to about 3 mols of dihydric phenol to 1 of triglycidyl cyanurate. Products of different properties and characteristics are produced by the process, depending on the proportions of dihydric phenol and triglycidyl cyanurate reacted.

One type or class of products which are higher melting point epoxy resins are produced by the reaction of an excess of triglycidyl cyanurate with materially less than the equivalent proportion of dihydric phenol. Thus, the reaction of 2 mols of triglycidyl cyanurate as a triepoxide with 1 mol of dihydric phenol is illustrated by the following reaction, in which R is the hydrocarbon residue of the dihydric phenol.

The reaction between the epoxide groups of the triglycidyl cyanurate and the phenolic hydroxyl groups of the dihydric phenol is a direct addition reaction. And since triglycidyl cyanurate is trifunctional and the dihydric phenol is difunctional, the products of reaction will vary depending upon the proportions of reactants used and the extent to which the reaction is carried. And products of the three different types above referred to can be produced, namely, the epoxide resins resulting from the use of an excess of triglycidyl cyanurates, the polyhydric phenols resulting from the use of an excess of dihydric phenol, and intermediate products of incomplete reaction, including products which contain both epoxide and phenolic groups, and insoluble and infusible products resulting from the reaction of the triglycidyl cyanurate and dihydric phenols in equivalent proportions or proportions approaching equivalent proportions.

In producing the first type or class of products which are soluble, fusible polyepoxides or epoxide resins, the molecular ratio of triglycidyl cyanurate to dihydric phenol lies within the range of about 2.0 to about 1.2, or between a ratio of about 2 mols of triglycidyl cyanurate to one mol of dihydric phenol and about 6 mols of triglycidyl cyanurate to 5 mols of dihydric phenol. Preparations within these ratios will produce polyepoxides, properly prepared, without giving cross-linked products during the preparation. Reaction products which are reacted to a point short of complete reaction can be produced as soluble, fusible polyepoxides which will undergo further reaction on curing or on further treatment.

The second type or class of products, which are cross-linked products, are produced from proportions of triglycidyl cyanurate and dihydric phenol within the range of from about 6 mols of triglycidyl cyanurate to about 5

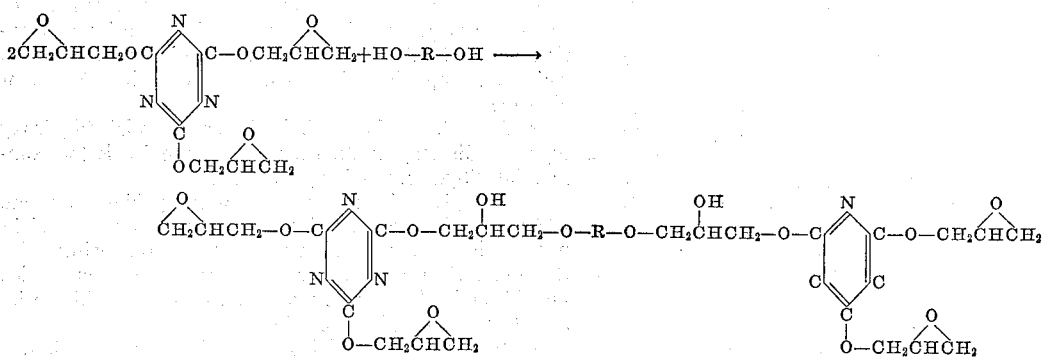

With increase of the proportion of dihydric phenol but with the triglycidyl cyanurate still in excess, polymeric products are produced and cross-linked products may be formed.

When proportions of triglycidyl cyanurate and dihydric phenol are used which are approximately equivalent, considering one epoxide group of the triglycidyl cyanurate as equivalent to one hydroxyl group of the dihydric phenol, reaction products of an insoluble and infusible character can readily be produced.

When an excess of dihydric phenol is used, for example 3 mols of dihydric phenol to 1 mol of triglycidyl cyanurate, the reaction results in the production of a trihydric phenol having the following formula, in which R is the hydrocarbon residue of the dihydric phenol:

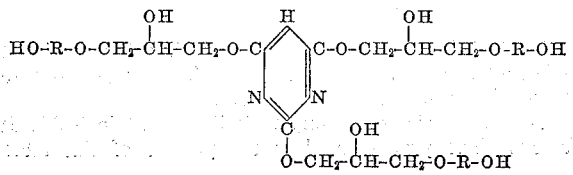

mols of dihydric phenol, to about 4 mols of triglycidyl cyanurate to 9 mols of dihydric phenol. Reactions of these materials in these proportions result in cross-linked products provided the reactions are carried to completion. If triglycidyl cyanurate and dihydric phenol are combined and reacted in the above ratios but with stopping of the reaction before completion, the resulting product will contain both epoxy groups and unreacted phenolic hydroxyl groups. Products of incomplete reaction can thus be produced of a soluble fusible nature which, on further heating or further reaction, are converted into the insoluble cross-linked stage.

The third type or class of products, which are soluble, fusible polyhydric phenols, containing e.g. from 3 to 6 phenolic hydroxyl groups per molecule, are produced by reacting triglycidyl cyanurate and polyhydric phenol within the range of ratios from about 4 mols of triglycidyl cyanurate to nine mols of dihydric phenol, to about 1 mol of triglycidyl cyanurate to 3 mols of dihydric phenol. Soluble, fusible, polyhydric phenols can thus be produced without cross-linking. If the reaction is carried somewhat short of completion, the polyhydric phenol produced may still contain a limited amount of unreacted epoxy groups which can further react with phenolic hydroxyl groups in carrying the reaction to completion.

From the reactions illustrated in the above equation and formulas, it will be noted that when a dihydric phenol reacts with epoxide groups of the triglycidyl cyanurate, the resulting product contains alcoholic hydroxyl groups. In producing the polyepoxides and the cross-linked products, these alcoholic hydroxyl groups may, and probably do in some cases, react with epoxide groups when the polyepoxides are further reacted or cured or when cross-linked products are formed.

The triglycidyl cyanurate used in the present process and in producing the new products may vary somewhat in its properties, depending upon its state of purity or the presence of small amounts of hydrolyzed and polymeric products simultaneously produced. Triglycidyl cyanurate can, for example, be produced as described in U.S. Patent 2,741,607 or by the process described in my prior U.S. application Ser. No. 542,103. As described in said prior application, cyanuric acid is reacted with epichlorhydrin in the presence of a catalyst to form the trichlorhydrin derivative, which is dehydrohalogenated to produce the triglycidyl cyanurate. The triglycidyl cyanurate may not be a pure product but may contain some residual chlorine, and may contain hydrolyzed epoxy groups, and may contain or be admixed with small amounts of polymeric products.

One mol of triglycidyl cyanurate is that amount of pure or somewhat impure triglycidyl cyanurate required to supply three epoxy groups, and the ratios previously referred to and hereafter referred to are on that basis. The epoxy equivalent of the pure or somewhat impure triglycidyl cyanurate used is determined as hereinafter indicated.

The dihydric phenols used in the process include mononuclear dihydric phenols such as resorcinol and polynuclear phenols such as dihydroxy diphenyl, p,p-dihydroxy dipheny dimethyl methane (Bisphenol A) and other dihydric phenols having two phenolic hydroxyl groups.

The reaction of the triglycidyl cyanurate and dihydric phenol is advantageously carried out with the addition of a catalyst and particularly with a suitable organic base as a catalyst, such as tertiary amines, e.g., tripropyl amine and dimethyl aniline; quaternary ammonium hydroxides such as benzyl trimethyl ammonium hydroxide; quaternary ammonium salts such as benzyl trimethyl ammonium chloride (BTMACl); and quaternary ammonium ion-exchange resins. Quaternary ammonium salts such as benzyl trimethyl ammonium chloride are particularly advantageous.

The reaction can be carried out in a suitable solvent for the reactants and which may also be a solvent of the reaction product produced. The reaction can also be carried out in the absence of a solvent by directly reacting the triglycidyl cyanurate and the dihydric phenol. And this is advantageous where a final reaction product is to be directly produced, such as an insoluble or infusible molded product.

The products of the process will vary from liquid products to high melting point solids and to insoluble, infusible products. Where an excess of dihydric phenol is used, the reaction products, if completely reacted, will be free from epoxide groups. Incompletely reacted products may still contain epoxide groups as well as phenolic groups. Reaction products produced with an excess of triglycidyl cyanurate, if completely reacted, will be free from phenolic groups but will contain unreacted epoxy groups. And if the products are incompletely reacted, they may also contain unreacted phenolic groups.

The products will, accordingly, vary in their epoxide equivalents, from products which have no epoxide groups to products which have a high epoxide equivalent.

The epoxide equivalent is the equivalent weight of the product per epoxide group. The method used for determining the epoxide content comprises heating 1 gram sample of the product with an excess of pyridine containing pyridine hydrochloride (made by adding 16 cc. of concentrated hydrochloric acid per liter of pyridine) at the boiling point for 20 minutes and back titrating the excess pyridine hydrochloride with 0.1 N sodium hydroxide, using phenolphthalein as indicator, and considering that 1HCl is equivalent to 1 epoxide group.

The high melting point epoxide resins of the present invention, produced by the use of an excess of triglycidyl cyanurate, are valuable epoxide resins. Similarly, the different products which are essentially polyhydric phenols resulting from the reaction of an excess of dihydric phenol with triglycidyl cyanurate are high melting point polyhydric phenols of a resinous character and capable of reaction as polyhydric phenols.

Intermediate reaction products, from intermediate proportions of dihydric phenol and triglycidyl cyanurate, may directly be produced in an insoluble and infusible state or can be partially reacted to form an intermediate reaction product which can then be further reacted to form the infusible insoluble product.

The invention will be further illustrated by the following examples, but it will be understood that the invention is not limited thereto. In the examples, the parts are by weight.

In the examples illustrated in Table I, the process was carried out by weighing the desired amount of triglycidyl cyanurate and dihydric phenol and dioxane was used as a solvent to form a solution containing 60% solids (N.V.M.). As a catalyst, ½% benzyl trimethyl ammonium chloride was used. The process was carried out in a three-necked flask equipped with mechanical stirrer, thermometer and reflux condenser and electrically heated. The reaction mixture was heated at reflux of 105–110° C. for one hour, then additional dioxane was added to make a 50% solution of solids, and the resulting solution was cooled.

The triglycidyl cyanurate used in the examples of Table I was produced as described in my prior application Serial No. 542,103, had melting points of 42–46° C., weights per epoxide of 140–145, and contained 3–6% of chlorine.

In Table I, Bisphenol A is the commercial dihydroxy diphenyl dimethyl methane, and Bisphenol S is the commercial dihydroxy diphenyl sulfone.

Table I gives the molar ratio of triglycidyl cyanurate (TGC) to dihydric phenol used in the reaction, the weight per epoxide of the products produced in comparison with the theoretical weight per epoxide; the percent solids (N.V.M.) in the resulting solution of the epoxide resin, and the viscosity of the solution.

In the process in which Bisphenol S was used, it was found that the addition of water, from 2–5%, gave a much thinner solution, and Table I indicates the 5% water content in this example.

Table I

| Dihydric Phenol | Molar Ratio (TGC/Dihydric Phenol) | Weight per Epoxide | | Percent NVM | Visc. |
|---|---|---|---|---|---|
| | | Act. | Theo. | | |
| Bisphenol A | 2/1.33 | 299 | 352 | 49.2 | O—P |
| Do | 2/1.5 | 317 | 404 | 49.8 | M—N |
| Bisphenol S | 2/1.33 | 436 | 372 | 42.5 | 1 J |
| Resorcinol | 2/1.5 | 307 | 351 | 40 | R—S |
| Dihydroxy Diphenyl | 2/1.33 | 312 | 346 | 50 | V—V |
| Do | 2/1.5 | 311 | 389 | 51 | Y—Z |

[1] Contains 5% H₂O in the solution.

Table I indicates examples in which a high ratio of triglycidyl cyanurate to dihydric phenol was used to form higher melting point epoxide resins.

Another series of examples is illustrated in Table II below. The process used in the process of this table was similar to that used in the varnishes of Table I, but with the use of flasks heated in an oil bath at 125–130° C. After heating one hour in the oil bath with refluxing, the products were removed and cooled. The triglycidyl cyanurates used were the same as those above referred to in connection with Table I.

Table II indicates the dihydric phenol used, the molar ratio of triglycidyl cyanurate and dihydric phenol used and the weight per epoxide of those products where this weight was determined, as well as the percent of solids in the solution and the viscosity of the solution.

*Table II*

| Dihydric Phenol | Molar Ratio (TGC/Dihydric Phenol) | Weight per Epoxide | | Percent NVM | Visc. |
| --- | --- | --- | --- | --- | --- |
| | | Act. | Theo. | | |
| Bisphenol A | 2/3 | 419 | ∞ | 48.7 | E |
| Bisphenol S | 2/3 | 5,200 | ∞ | 47.2 | [1]O |
| Do | 2/3 | 8,500 | ∞ | 48.3 | N |
| Resorcinol | 2/3 | 424 | ∞ | 48.3 | L |

[1] Contains 2.4% water in the solution.

The solutions of the above examples of Tables I and II can be used in making films which are cured e.g. for ½ hour at 150° C.

The reaction can also be carried out without the use of a solvent, for example by admixing 3 mols of Bisphenol A and 2 mols of triglycidyl cyanurate, adding 2% benzyl trimethyl ammonium chloride as a catalyst, applying the resulting mixture as a film and baking for one hour at 150° C.

The reaction can also be carried out by applying a solution of the reactive materials together with a catalyst, removing the solvent and heating to carry out the reaction to form and cure the film. As an example, 3 mols of triglycidyl cyanurate and 2 mols of Bisphenol A were dissolved in dioxane to form a solution containing 60% solids and with the aid of just enough heat to effect solution. Benzyl trimethyl ammonium chloride was added as a catalyst in amounts of 1% and 2% in different examples. Films were applied from this solution, the solvent removed and the reaction carried out at 150° C. for one hour with resulting forming and curing of the film.

Films produced from the products of the above examples without the use of a catalyst and cured for ½ hour at 150° C. varied somewhat in their properties. The films had good mar resistance and adhesion and hardness but were somewhat brittle. Curing with the addition of 4%–8% of tetraethylene pentamine gave films which were less brittle.

The following examples illustrate other proportions of triglycidyl cyanurate and dihydric phenol and the different kinds of products produced with the different proportions.

As one illustrative example, 2 mols of triglycidyl cyanurate and 1 mol of Bisphenol A were used in solution in dioxane with benzyl trimethyl ammonium chloride as the catalyst, in the following proportions:

| | Parts |
| --- | --- |
| TGC | 90.0 |
| Bisphenol A | 22.8 |
| 60% aq. BTMACl | 1.0 |
| Dioxane | 100 |

The process was carried out with refluxing for one hour. The product had a weight per epoxide of 252 and was a clear homogeneous product and a product which approximates a tetraepoxide in its composition, such as would be expected from the reaction of 2 mols of triglycidyl cyanurate and 1 mol of Bisphenol A, according to the reaction above illustrated.

In contrast with the last example, the following example illustrates the preparation of a phenol terminated resin by the use of an excess of Bisphenol A. In this example, 3 mols of Bisphenol A was used with 1 mol of triglycidyl cyanurate in dioxane solution and with benzyl trimethyl ammonium chloride as a catalyst, the amounts used in the example being as follows:

| | Parts |
| --- | --- |
| TGC | 45.0 |
| Bisphenol A | 68.4 |
| 60% aq. BTMACl | 1.0 |
| Dioxane | 100 |

The process was carried out with refluxing for 2 hours. The product, freed from solvent, had a melting point of 79.5° C., was a clear, homogeneous, uniform solid, and contained no residual epoxy groups.

The following example illustrates the use of triglycidyl cyanurate and Bisphenol A in equivalent proportions, that is, in such a ratio that there is one phenolic hydroxyl group for each epoxide group, which corresponds to 3 mols of Bisphenol A to 2 mols of triglycidyl cyanurate.

In this example, 18 parts of triglycidyl cyanurate and 13.6 parts of Bisphenol A were used, and 1% of benzyl dimethyl amine added as a catalyst, and the mixture was cured by heating for one hour at 100° C., giving a hard, brittle resin.

From the foregoing description, it will be seen that the invention includes the reaction of triglycidyl cyanurate, either in a pure or somewhat impure state, with a dihydric phenol, in a range of proportions which can give three different types or classes of products, depending upon the proportions of triglycidyl cyanurate and dihydric phenol reacted, and including soluble and fusible polyepoxides, cross-linked products which may first be produced in the form of a soluble and fusible intermediate incomplete reaction product which can be converted into the final cross-linked product, and polyhydric phenols which result from the reaction of an excess of dihydric phenol with the triglycidyl cyanurate.

The polyepoxides are epoxide resins which are soluble and fusible and can be used by themselves or for reaction with other products in making coating compositions, adhesives, molded products, etc.

The cross-linked products can be used for producing directly surface coatings, adhesives, molded products, etc., or intermediate soluble, fusible reaction products can be produced which are subsequently converted to the final cross-linked product either by themselves or for admixture with other materials.

The polyhydric phenols are unusually high molecular weight polyhydric phenols which are valuable products for use in the production of epoxide resins or for reaction with cross-linking reagents, such as diepoxides, e.g., aliphatic diepoxides, including diglycidyl ethers of dihydric alcohols, diglycidyl ethers of dihydric phenols, etc.

I claim:

1. The method of making resinous products which comprises heating a mixture of triglycidyl cyanurate and a dihydric phenol to a reaction temperature in proportions between about 1 mol of dihydric phenol to 2 mols of triglycidyl cyanurate and about 3 mols of dihydric phenol to 1 mol of triglycidyl cyanurate in admixture with an organic base as a catalyst.

2. The method of forming soluble, fusible epoxide resins which comprises heating to a reaction temperature a mixture of dihydric phenol with a molecular excess of triglycidyl cyanurate in admixture with an organic base as a catalyst.

3. The method of forming soluble, fusible epoxide resins which comprises heating to a reaction temperature a mixture of dihydric phenol with an excess of triglycidyl cyanurate in proportions between about 2 mols of triglycidyl cyanurate to 1 mol of dihydric phenol and about 6 of triglycidyl cyanurate to 5 of dihydric phenol in admixture with an organic base as a catalyst.

4. The method of forming soluble, fusible epoxide resins which comprises heating to a reaction temperature a mixture of dihydric phenol with an excess of triglycidyl cyanurate in proportions of about 2 mols of triglycidyl cyanurate to 1 mol of dihydric phenol in admixture with an organic base as a catalyst.

5. The method of forming soluble, fusible epoxide resins which comprises heating to a reaction temperature a mixture of dihydric phenol with an excess of triglycidyl cyanurate in proportions of about 6 mols of triglycidyl cyanurate to 5 mols of dihydric phenol in admixture with an organic base as a catalyst.

6. The method of making polyhydric phenols which comprises heating to a reaction temperature of triglycidyl cyanurate with a molecular excess of dihydric phenol in admixture with an organic base as a catalyst.

7. The method of making polyhydric phenols which comprises heating to a reaction temperature a mixture of triglycidyl cyanurate with an excess of dihydric phenol in proportions of from about 3 mols of dihydric phenol to 1 of triglycidyl cyanurate to about 9 mols of dihydric phenol to 4 mols of triglycidyl cyanurate in admixture with an organic base as a catalyst.

8. The method of making infusible, insoluble resinous products which comprises reacting by heating to a reaction temperature a mixture of triglycidyl cyanurate and dihydric phenol in proportions from about 6 mols of triglycidyl cyanurate to 5 mols of dihydric phenol to about 4 mols of triglycidyl cyanurate to 9 mols of dihydric phenol in admixture with an organic base as a catalyst.

9. A soluble, fusible polyepoxide containing at least 3 epoxide groups per molecule resulting from the reaction with heat of a dihydric phenol with a molecular excess of triglycidyl cyanurate in admixture with an organic base as a catalyst.

10. A soluble, fusible polyepoxide resulting from the reaction with heat of triglycidyl cyanurate with a dihydric phenol in proportions between about 2 mols of triglycidyl cyanurate to 1 mol of dihydric phenol and about 6 mols of triglycidyl cyanurate to 5 mols of dihydric phenol in admixture with an organic base as a catalyst.

11. A soluble, fusible polyepoxide resulting from the reaction with heat of approximately 1 mol of dihydric phenol with approximately 2 mols of triglycidyl cyanurate in admixture with an organic base as a catalyst.

12. Polyepoxides resulting from the reaction with heat of triglycidyl cyanurate with a dihydric phenol in proportions of about 6 mols of triglycidyl cyanurate to 5 mols of dihydric phenol in admixture with an organic base as a catalyst.

13. A polyhydric phenol containing at least 3 phenolic hydroxyl groups resulting from the reaction with heat of triglycidyl cyanurate with a molecular excess of dihydric phenol in admixture with an organic base as a catalyst.

14. Insoluble, infusible reaction products resulting from the reaction with heat of proportions of triglycidyl cyanurate and a dihydric phenol between the ratios of about 6 mols of triglycidyl cyanurate to 5 mols of dihydric phenol to about 4 mols of triglycidyl cyanurate to 9 mols of dihydric phenol in admixture with an organic base as a catalyst.

15. Resinous products resulting from the reaction with heat of a mixture of triglycidyl cyanurate and dihydric phenol to a reaction temperature in proportions between about 1 mol of dihydric phenol to 2 mols of triglycidyl cyanurate and about 3 mols of dihydric phenol to 1 mol of triglycidyl cyanurate in admixture with an organic base as a catalyst.

References Cited in the file of this patent

UNITED STATES PATENTS

| | | |
|---|---|---|
| 2,668,807 | Greenlee | Feb. 9, 1954 |
| 2,741,607 | Bradley et al. | Apr. 10, 1956 |